United States Patent
Wilson

(10) Patent No.: US 8,000,582 B2
(45) Date of Patent: Aug. 16, 2011

(54) SYSTEM AND METHOD FOR DISPOSAL OF DIGITAL MEDIA

(76) Inventor: Kelce S. Wilson, Murphy, TX (US)

( * ) Notice: Subject to any disclaimer, the term of this patent is extended or adjusted under 35 U.S.C. 154(b) by 1468 days.

(21) Appl. No.: 11/450,751

(22) Filed: Jun. 9, 2006

(65) Prior Publication Data
US 2008/0121085 A1 May 29, 2008

(51) Int. Cl.
*H04N 9/80* (2006.01)
(52) U.S. Cl. ............. 386/252; 241/112; 83/856; 360/55
(58) Field of Classification Search .................... 386/46, 386/252; 360/55; 83/856; 241/112
See application file for complete search history.

(56) References Cited

U.S. PATENT DOCUMENTS
6,039,637 A * 3/2000 Hutchison et al. ............ 451/271
2006/0070094 A1 * 3/2006 Sun et al. ...................... 720/718

OTHER PUBLICATIONS

"How do I destroy CD-R media beyond all hope of recovery?," http://www.cdrfaq.org/faq07.html#S7-20; Cd Shredder prior art internet docs.doc, Aug. 11, 2005, pp. 1-2.
B. Starrett, "How to Destroy a CD-R," http://www.peachpit.com/articles/article.asp?p=20780&rI=1, Cd shredder prior art internet docs.doc, Mar. 1, 2001, pp. 1-2.
Kensington, Shoplet.com; http:www.shoplet.com/office/db/g23701.html, Media guardian 3.5" CD Destroyer, Cd Shredder prior art internet docs.doc, pp. 1-2.
Alex_C-P. Enthusiast, How to destroy a CD-R? Macworld Magazine and Macworld.com >>Mac 911, May 11, 2005, http://www.macworld.com/forums/ubbthreads/showflat.php?Cat=&Board=UBB13&Number=32 2420&page=0&view=collapsed &sb=9&o=&fpart=1, Cd Shredder prior art internet docs.doc, pp. 1-11.

* cited by examiner

*Primary Examiner* — Thai Tran
*Assistant Examiner* — Girumsew Wendmagegn
(74) *Attorney, Agent, or Firm* — Kelce S. Wilson

(57) ABSTRACT

A system and method are described for rendering Compact Discs (CDs) and Digital Video Discs (DVDs) unreadable. Embodiments comprise a frame, a guide for constraining motion of the frame with respect to a disc, and at least one scraping element. Scraping elements may be positioned to damage the disc volume descriptor while the frame moves in a constrained manner relative to the disc. The guide may comprise a spindle which engages the center hole of a disc to hold the frame in a radially-fixed position. A scraping element on the frame damages the disc as the disc rotates relative to the frame. The guide may be integrated, such that the frame comprises a slot through which the disc passes. A scraping element inside the slot damages a disc as it passes through. Embodiments are hand operated, not motorized, and some have no moving parts. Embodiments also function with non-optical media.

8 Claims, 3 Drawing Sheets

SYSTEM AND METHOD FOR DISPOSAL OF DIGITAL MEDIA

TECHNICAL FIELD

The invention relates generally to computer security devices, and more specifically to devices for destruction of computer-readable media.

BACKGROUND OF THE INVENTION

Disposal of intact Compact Discs (CDs) and Digital Video Discs (DVDs), including CD-Rs, CD-RWs, DVD-Rs and DVD-RWs, risks disclosure of information contained on the media, similar to the risks faced during disposal of intact paper documents. The paper security problem has been largely addressed, with the widespread availability of relatively inexpensive paper shredders for home, business and industrial environments. However, an equivalently reliable and cost-effective solution for rendering discs unreadable is not in widespread use.

As CD and DVD writers are becoming more affordable, there is an increase in the use of these types of discs for storage of confidential information. Businesses store trade secrets and personal information that is subject to privacy restrictions. Home users often write financial data and highly personal information on CDs and DVDs. If these are placed in the trash in an intact state, the confidential information may then be read by anyone who removes the discs from the trash.

Common methods to render a disc unreadable include burning, pulverizing, shattering, snapping, grinding and scratching the label side of the disc into the data layer. Burning and pulverizing may be quite effective in rendering a disc unreadable. Unfortunately, those methods may require expensive equipment. Shattering and snapping can be difficult for people without either the required strength or tools. Additionally, shattering or snapping a disc presents a risk of injury from sharp, flying shards. Multiple models of disc grinders are available, although their size, cost and requirement for electric power may limit their desirability for certain potential users.

Scratching into the data layer can often be done easily with any sharp instrument. However, it presents risks, including injury and unintentional damage to other surfaces. Further, the damage to the disc may not be complete enough to render a disc unreadable. One reason that scratching a disc may not be adequate is that a typical disc user may not be aware of the physical layout of the data on a CD or DVD surface, and therefore may not sufficiently damage the critical data areas.

A CD typically contains a volume descriptor in sector 16, which is within a fraction of an inch of the innermost portion of the optically-readable section of the disc. Disc readers typically first read the volume descriptor, also known as an index, to determine the contents of the disc. If this section is damaged or missing, the majority of disc readers may be unable to read the disc. However, due to its small size and its location near the innermost part of the optically-readable area, it is easy to miss with uncontrolled, random scratching. A disc with an intact volume descriptor may still be readable, and files whose data area has not been adequately damaged may be fully recoverable. Therefore, simply scratching a disc randomly with a sharp instrument does not provide safe, quality-controlled destruction.

BRIEF SUMMARY OF THE INVENTION

Embodiments of the invention allow for a reliably consistent level of damage by guiding a scraping element across at least one predetermined area of a disc, such as the volume descriptor. Embodiments of the invention require no motors and may have no moving parts. That is, some embodiments of the invention may be rigid devices that move as a single unit relative to a disc, while holding at least one scraping element that scrapes the disc during the motion. Some embodiments, however, may comprise flexible scraping element(s) that flex or partially retract into cavities in response to pressure from a disc against the scraping elements. Relative motion may be rotational, straight across, or even curved, resulting in one or more scraping paths that form arced, straight, waved, looped lines or a combination thereof.

The relative positions allowed between a scraping element and a disc may be constrained such that relative motion between the scraping element and the disc is constrained for at least part of the motion. The relative motion between a scraping element and a disc may be constrained by using a guide to constrain relative motion between the disc and a frame that holds the scraping element. The constraint may serve to align the disc with the scraping element(s). Embodiments of the invention allow for multiple types of guides, including a spindle that engages the center hole of a disc and allows only rotational motion. The spindle holds the frame in a radially-fixed position, such that a scraping element moves in an arced scraping path at a predefined radius. The radius of the scraping path may correspond to the radius at which the volume descriptor may be found, or any other part of a disc targeted for damage.

Embodiments of the invention may also comprise at least one guide that protrudes from the frame to abut the edge of a disc. Such a guide may constrain the relative position of the frame when the frame spans a disc at its widest point. Since the position of the guide may be fixed relative to the frame, and the position of a scraping element may also be fixed relative to the frame, the position of the scraping element may then be fixed relative to the edge of the disc. A pressure element may be provided, which holds a disc against the scraping elements. In some embodiments, guides that abut opposing edges of a disc may form a rectangular slot along with a pressure element and a frame holding the scraping elements. A disc passing through the slot will then have its motion constrained by the inner dimensions of the slot. Scraping elements on both the frame and the pressure element can ensure that both sides of a disc are damaged.

Embodiments of the invention may comprise multiple scraping elements to provide multiple scraping paths. A certain number of paths may be desired to achieve a particular level of damage, such that the data area sustains damage at some desired density.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

In many situations, it may only be necessary to destroy a disc's volume descriptor, or file index, in order to provide the desired level of destruction. In other situations, destroying both the file index and a portion of the data area, leaving other portions of the data area untouched, may suffice. That is, it may not be necessary to render a disc entirely unreadable by all equipment, in order to achieve a security goal. Some equipment and software is available to enable reading a disc with a damaged volume descriptor and rebuilding much of the disc's content. However, not every disposal situation requires addressing the threat posed by such equipment and software. Rather, based on the data density and locations of data on a disc, a number of scraping elements may be provided to ensure that specific locations or a minimum percentage of the disc surface is damaged.

Figure 1:
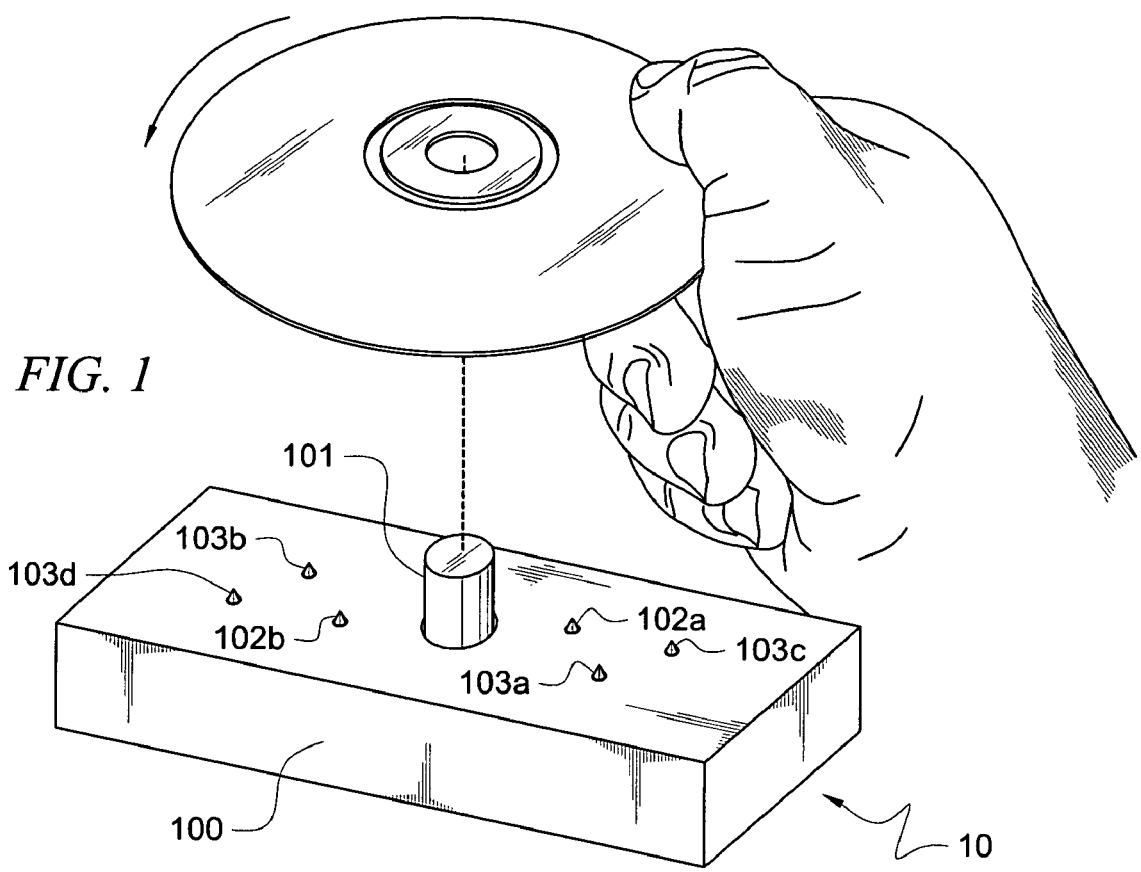
FIG. 1 shows an embodiment of the invention.

FIG. 1 shows disc scraper 10, comprising frame 100 and spindle 101 that engages the center hole of a disc. Spindle 101 protrudes sufficiently beyond any other protrusions from the frame in order to pass through the disc's hole, and is sized to fit the hole. When a disc is placed over spindle 101, frame 100 may rotate with respect to the disc, but cannot move radially with respect to the disc. That is, while the frame is in a radially-fixed position with respect to the disc, either the disc or the frame may rotate, or both. Spindle 101 should be sized to limit lateral movement between a disc and the frame, but should not be so tight in the disc that it causes unnecessary drag during rotation.

Scraping elements 102a and 102b are positioned between 21 and 23 millimeters (mm) from the center axis of spindle 101, in order to scrape the volume descriptor. If scraping elements 102a and 102b are opposite the center axis of spindle 101 from each other, then rotating the frame only half a circle will trace an entire circle on the disc, scraping the entire volume descriptor. Operation of scraper 10 requires a user to press a disc by hand, or another suitable method, against scraper 10 and rotate the disc and scraper 10 relative to each other.

Scraping elements 103a-d are positioned further than 25 mm from the center axis of spindle 101, in order to damage the data area of a disc outside the volume descriptor. Any number of scraping elements may be used, based on the desired scratching or scraping density and the width of each scraping element. Scraping elements 102a and b and 103a-d are shown as pointed, stylus-type sharp points, however, any shape that would damage the disc could be used. Some shapes could remove more material from the disc than sharp points, but wider shapes could increase the resistance to rotating the frame. For example, a blade that is approximately 2 mm wide could scrape the entire width of the volume descriptor, but without the resistance from a blade that spanned the entire optically-readable portion of the disc.

Note that scraper 10 has no moving parts. That is, while scraper 10 moves as a unit with respect to a disc, frame 100, spindle 101 and scraping elements 102a-103d do not move relative to each other. It is possible that any of scraping elements 102a-103d, which are shown as rigidly attached to frame 100, could be made with flexible material. However, as defined herein, a rigidly-attached, flexing element is not a moving part. Further, spindle 101 of could be adapted such that at least a portion of spindle 101 rotates along with a disc with respect to frame 100. This could be accomplished by either having a rotating joint at the point where spindle 101 is coupled to frame 101, or by having a sleeve that fits over spindle 101 such that the sleeve stays fixed in position relative to a disc, but rotates relative to frame 101.

Figure 2:
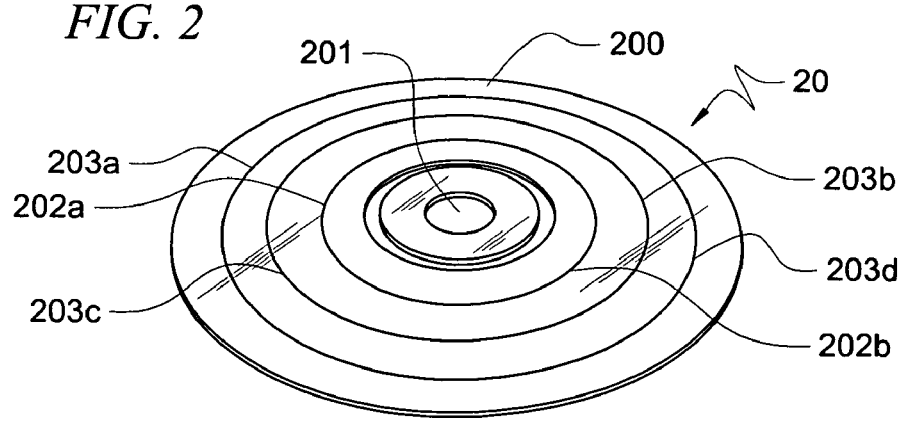
FIG. 2 shows damage done to a disc by the embodiment of FIG. 1.

FIG. 2 shows the damage done to disc 20 by scraper 10 of FIG. 1. Disc 20 comprises center hole 201 and optically-readable portion 200. Center hole 201 fits over spindle 101, as described above. Optically-readable portion 200 is shown as having sustained damage from scraper 10. A circle comprising arcs 202a and 202b has been scraped by scraping elements 102a and 102b, indicating that disc 20 and scraper 10 have rotated at least half of a circle relative to each other. Had disc 20 and scraper 10 not rotated half of a circle, arcs 202a and 202b would not touch ends to form a complete circle. Arcs 203a-d are due to the scraping paths of scraping elements 103a-d. Disc 20 may retain intact data, but the damage is extensive enough to prevent many disc readers from reading it.

Figure 3:
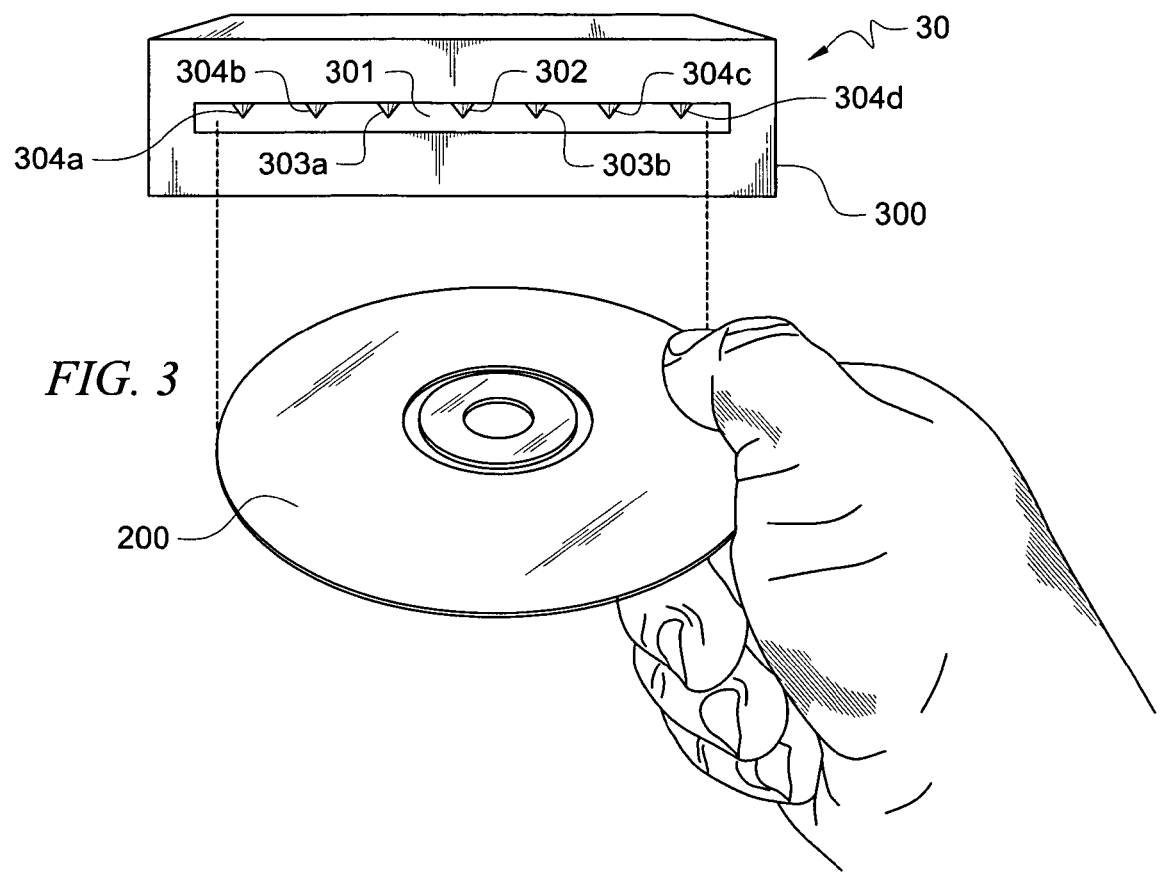
FIG. 3 shows another embodiment of the invention.

FIG. 3 shows disc scraper 30, another embodiment of the invention with no moving parts. Scraper 30 comprises frame 30 with slot 301 and scraping elements 302, 303a, 303b and 304a-d. Slot 301 is sized to allow a disc to pass through with minimal or no lateral clearance. The lack of lateral clearance will ensure that scraping elements 302, 303a, 303b and 304a-d cross predefined portions of a disc when the widest portion of the disc enters the slot. Prior to that, and after the widest portion of the disc has passed through frame 30, the disc may have lateral movement. Further, a disc may have some rotational motion as it passes through scraper 30, so scraping paths traced by scraping elements 302, 303a, 303b and 304a-d may not be straight. Rather, scraping paths may be waved lines, arcs, and even looped lines. However, whatever scraping paths may be, they will cross predefined locations when the widest part of the disc is constrained to pass through the slot without any lateral movement.

As shown in FIG. 3, scraping element 302 is approximately in the center of the widest dimension of slot 301. Scraping element 302 will then trace a scraping path across the center point of the disc. As scraping element 302 crosses from the optically-readable portion of a disc toward the center hole of the disc, it will damage the volume descriptor. Scraping elements 303a and 303b may be positioned to trace scraping paths that are tangential to the innermost portion of the optically-readable portion of the disc, thereby scraping a larger portion of the volume descriptor than scraping element 302. Typical discs would require scraping elements to be placed between 21 and 23 mm from the center of the widest dimension of slot 301.

In order for scraping elements 302, 303a and 303b to damage the volume descriptor, a disc must be inserted nearly half way into slot 301. In typical operation, though, a disc may be passed entirely through scraper 30, ensuring damage to the volume descriptor. At the half way depth of insertion, the sides of frame 300 constrain the position of a disc to be centered in slot 301. That is, the sides of frame 300 act as guides for the disc, to constrain its lateral motion as it moves relative to frame 300. If slot 301 is sized for typical CDs and DVDs, it will be approximately 12 centimeters (cm) wide, placing scraping elements 303a and 303b between 97 and 143 mm from an edge of slot 301.

Other scraping elements, such as 304a-d may be provided to damage a data area other than the volume descriptor. Further, scraping elements may also be placed on the opposing side of slot 301 from scraping elements 302, 303 and 304. The opposing side of frame 300 may provide pressure to force a disc surface up against scraping elements 302, 303 and 304. Since a typical disc is approximately 1 mm thick, slot 301 may be between 1.5 and 5 mm on its narrow dimension, to allow for the height of scraping elements 302, 303 and 304, and any scraping elements on the opposing side of slot 301. Scraping elements on both sides of slot 301 allow scraper 30 to operate effectively, no matter which side of the disc faces scraping elements 302, 303 and 304.

Figure 4:
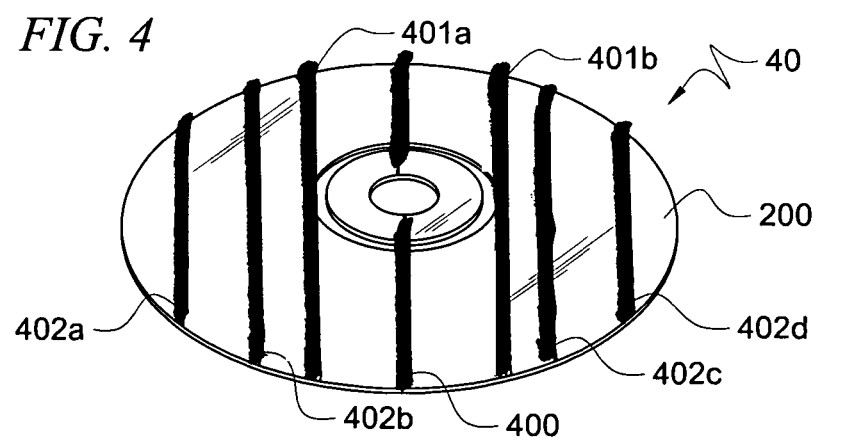
FIG. 4 shows damage done to a disc by the embodiment of FIG. 3.

FIG. 4 shows the damage done to disc 40 by scraper 30 of FIG. 3. Optically-readable portion 200 of disc 40 is shown as having sustained damage from scraper 30. Scraping path 400 is due to scraping element 302, and crosses the volume descriptor, near the innermost section of portion 200, twice. Scraping paths 401a and 401b are due to scraping elements 303a and 303b, and damage the volume descriptor more than path 400, since they run tangential to the innermost section of portion 200. Scraping paths 402a-d are due to scraping elements 304a-d, and damage portion 200 outside the volume descriptor region. Scraping paths 400-400d are shown as predominantly straight lines, however, since disc 40 may have unconstrained rotational motion relative to fame 300, the scraping paths may not be straight. Rather, paths 400-400d may be arbitrary lines, constrained only to pass at a certain distance from the outer edge of the disc when the disc is at the half way point through slot 301.

Figure 5:
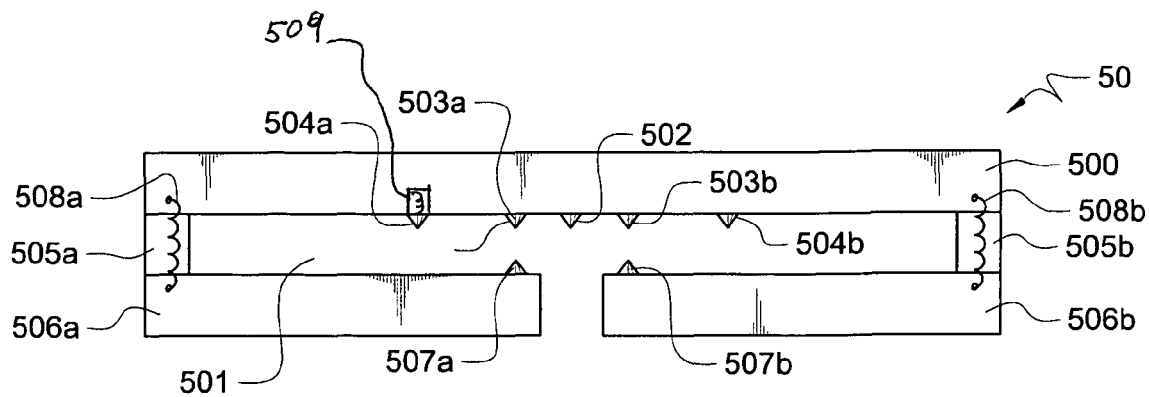
FIG. 5 shows options for various embodiments of the invention.

FIG. 5 shows various options for disc scraper 50, another embodiment of the invention that guides a disc using the disc edge, similar to the embodiment shown in FIG. 3. Scraper 50 comprises frame 500 and scraping elements 502-504b coupled to frame 500. Scraper 50 is shown with guide 505a, protruding from frame 500, along with optional guide 505b and optional pressure elements 506a and 506b. Optional pressure elements 506a and 506b are shown with optional scraping elements 507a and 507b, and are optionally spring-loaded, using springs 508a and 508b, in order to provide pressure for a disc against scraping elements 502-504b. In order to damage the volume descriptor of a typical disc, scraping elements 502-503b should be between 97 mm and 143 mm from guide 505a. This ensures that when guide 505a is against an edge of the disc, and scraping elements 502-503b cross the central area of the disc, they will also contact the volume descriptor.

Guide 505b is optional because is it possible to align scraping elements 502-503 b to damage a volume descriptor by pressing only guide 505a against the outer edge of a disc on one side. Further, it is possible for a user to maintain pressure on a disc against scraping elements 502-504b similar to the operation of scraper 10 of FIG. 1, without optional pressure elements 506a and 506b. Pressure elements 506a and 506b are shown as separated, rather than a single piece spanning from guide 505a to guide 505b. If pressure elements 506a and 506b were connected to form a single piece, scraper 50 would then comprise a closed slot, similar to scraper 30 of FIG. 3. Scraping element 504a is shown flexibly coupled to frame 500 via spring-loaded cavity 509. While the embodiments shown in FIGS. 1 and 3 are described as showing no moving parts, any of the scraping elements could be adapted to move in spring-loaded cavities, similar to lock tumblers. This could ensure that multiple scraping elements contact a disc even when the disc flexes. Scraping elements that move into and out of cavities in a frame will be fixed in two dimensions relative to the frame, and able to move only in one.

Figure 6:
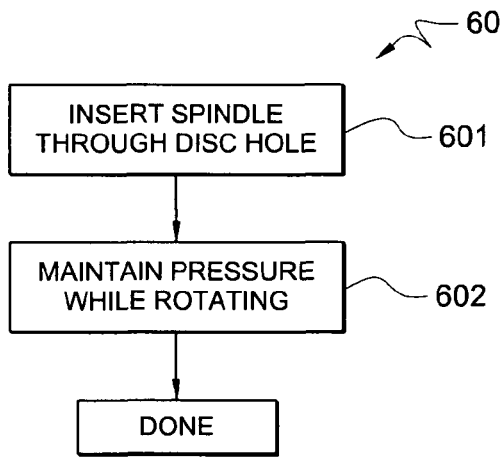
FIG. 6 shows a method for using an embodiment of the invention.
Figure 7:
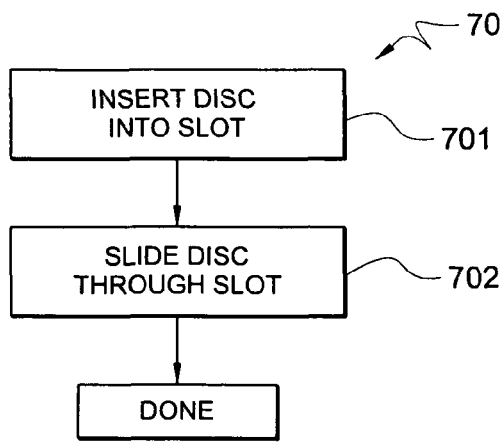
FIG. 7 shows a method for using an embodiment of the invention.

FIG. 6 shows method 60 for using an embodiment of the invention, such as the one shown in FIG. 1. In box 601, spindle 101 on scraper 10 of FIG. 1 is inserted through a center hole of a disc. In box 602, the user rotates scraper 10 relative to the disc while maintaining pressure to force the disc against scraper 10. The disc is then rendered unreadable by the majority of disc readers. FIG. 7 shows method 70 for using an embodiment of the invention, such as the one shown in FIG. 3. For scraper 30, a disc is inserted into slot 301 in box 701. The user then slides the disc through the slot in box 702 to render the disc unreadable.

As used herein, the term scraping element includes narrow, pointed tips that scratch a thin line, as well as broad blades. Also, as used herein, the terms CD and disc include all optically-readable discs, including commercially-prevalent 12 cm wide discs. Some embodiments of the invention, such as the embodiment shown in FIG. 1, may operate reliably on differently-sized optical media, including optically-readable business cards and minidiscs. Embodiments may also be used on non-optical media, if the media includes a portion, such as an index or volume descriptor, that stores information that allows for the use of the media.

The embodiments disclosed herein are self-aligning with respect to the volume descriptor. That is, when a guide engages a disc, whether the guide comprises spindle 101, slot 301, the edge of slot 301, or edge-engaging protrusions 505a-b, each scraping element will trace a pre-determined path across a disc. This is in contrast to any device in which a scraping element may trace a path across a disc at an arbitrary position relative to the index.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for rendering a digital media unusable, wherein the media includes a volume descriptor that stores information allowing for use of the media, the device comprising:
   a frame;
   a spindle protruding from the frame and configured to engage a center hole of the media, thereby operable to constrain relative motion between the frame and the media;
   two or more scraping elements attached to the frame, wherein at least two of the two or more scraping elements are operable to damage a volume descriptor of the media when the frame is moved with the constrained motion relative to the media, wherein a first one of the two or more scraping elements is positioned between 21 millimeters (mm) and 23 mm from a center axis of the spindle, wherein a second one of the two or more scraping elements is positioned between 21 mm and 23 mm from the center axis of the spindle, and wherein the first scraping element and the second scraping element are positioned to scrape a full circle on the media when the frame rotates approximately half of a circle relative to the media.

2. The device of claim 1 wherein the frame, the spindle and the two or more scraping elements do not move relative to each other.

3. The device of claim 2 wherein the device has no moving parts.

4. The device of claim 1 further comprising:
one or more scraping elements positioned further than 25 mm from the center axis of the spindle.

5. The device of claim 1 wherein at least one of the two or more scraping elements comprises a sharp point.

6. The device of claim 1 wherein at least one of the two or more scraping elements comprises a blade.

7. The device of claim 6 wherein the blade is between 1 millimeter (mm) and 3 mm wide.

8. The device of claim 1 wherein at least one of the one or more scraping elements is flexibly coupled to the frame.

* * * * *